J. O. NASLIN.
BOX NAILING FRUIT PRESS.
APPLICATION FILED FEB. 20, 1909.

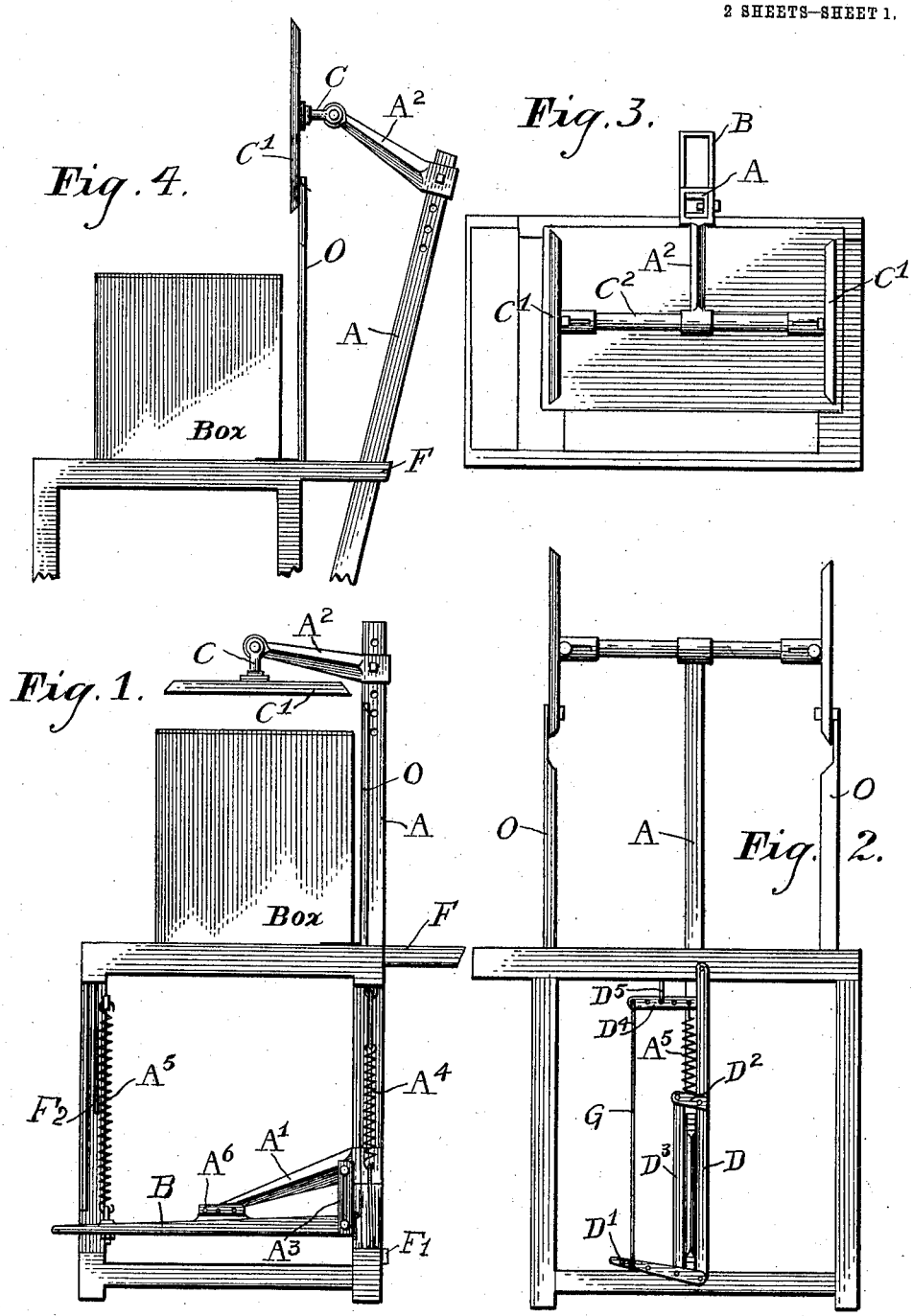

983,391.

Patented Feb. 7, 1911.
2 SHEETS—SHEET 2.

WITNESSES.
H. L. Reynolds.
Jno. W. Cover.

INVENTOR.
John O Naslin

UNITED STATES PATENT OFFICE.

JOHN O. NASLIN, OF BEAVER BEND ORCHARD, WASHINGTON.

BOX-NAILING FRUIT-PRESS.

983,391. Specification of Letters Patent. Patented Feb. 7, 1911.

Application filed February 20, 1909. Serial No. 479,187.

*To all whom it may concern:*

Be it known that I, JOHN O. NASLIN, a citizen of the United States, residing at Beaver Bend Orchard, in the county of Douglas, State of Washington, have invented a new and useful Box-Nailing Fruit-Press, of which the following is a specification.

My invention relates to an apparatus used for pressing fruit into packages and for assisting in securing the cover of each package.

The object of my invention is to provide an apparatus which may be used to facilitate the operation of securing the covers upon fruit packages and in giving the fruit therein the slight compression which is needed to insure against injury in handling and transportation, and also to do this work in a more thorough and even manner.

My invention comprises the novel parts and combinations of parts which will be hereinafter described and particularly pointed out in the claims.

In the accompanying drawings I have shown my invention embodied in the forms which are now preferred by me.

Figure 6:
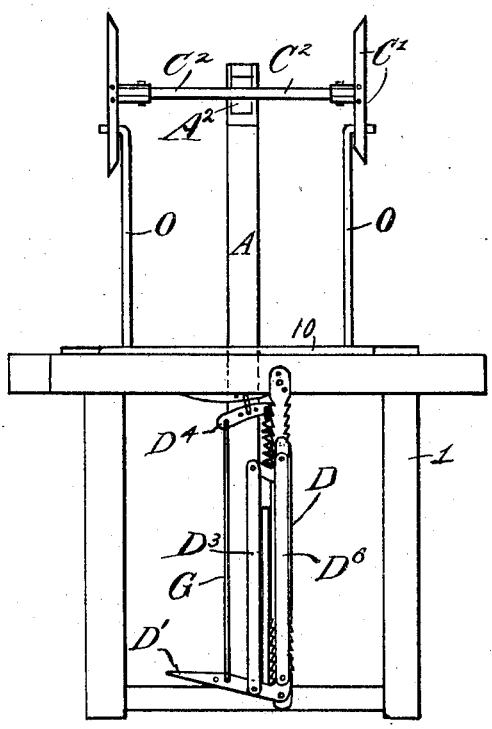
Figure 5:
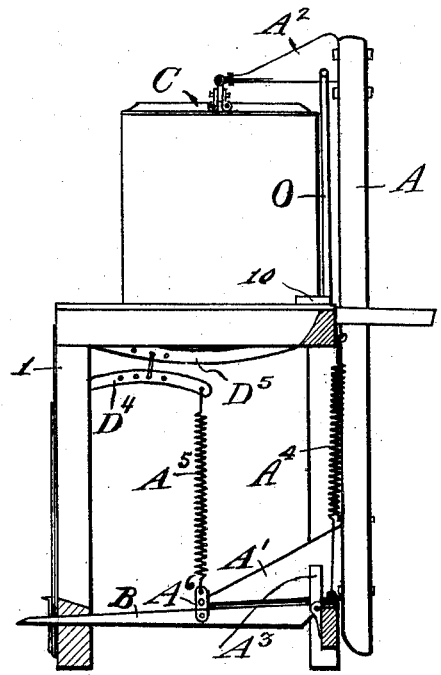

Figure 1 is a side sectional elevation of my machine. Fig. 2 is a front elevation of my machine. Fig. 3 is a top or plan view of my machine. Fig. 4 is a side sectional elevation of my machine, with the pressing parts thrown back out of the way. Fig. 5 is a side elevation and partial section of certain modified constructions. Fig. 6 is a front elevation of the construction shown in Fig. 5.

My invention is applicable to use in packing any kind of fruit and in many kinds of packages where it is required to press the fruit in place before securing the cover. For convenience, I will herein describe it as applied in the packing of apples and pears in boxes, although it may be used for other fruit and in connection with other kinds of packages, as barrels. Such variation in use will be evident and will only require a variation in proportion and size of parts without an essential change in the principles employed.

In packing fruit, and especially so in connection with apples and pears, it is necessary to gently press the fruit into the packages so that there can be no shaking about in handling or transportation, as otherwise the fruit will become badly bruised and decay.

My machine is designed to give the fruit this gentle compression and at the same time hold the package cover in place for nailing.

For the reason that apples, in this section of the country are invariably packed in boxes and never in barrels, I have shown my invention adapted to use with such a package.

The salient features of my invention consist of a clamp with holding cleats adapted to engage the package cover, to force and hold it in place and carried by a reciprocating and swinging upright bar, in combination with suitable means as a treadle and devices for holding and releasing the same, whereby the said reciprocating bar is operated.

I have shown my device as mounted upon a frame (1), which is of open wood construction having four legs. Upon the upper part of this frame is provided a bed for the reception of the package containing the fruit. Stops (10), are provided to insure that each package will occupy exactly the same position. These stops should be of such shape and so placed as to provide a shallow recess which exactly receives one side of the package. Where the package used is a box, the support therefor should be only at the ends, as the bottom should bulge slightly downward under the pressure applied to the fruit and the top. Such packages bulge at top and bottom and are always piled upon their sides.

The clamp has two holding bars or cleats ($C^1$), these being so placed as to engage with the ends of the cover at such a distance from the ends as will allow nailing the cover to the box ends. These cleats are connected to a yoke or bar ($C^2$), which is hinged upon an arm ($A^2$) which is adjustably secured to the upper portion of the vertical bar (A). I prefer that arm ($A^2$) be secured to the bar (A), so as to be adjustable as to height, as by clamping or set screws, whereby it may be adjusted for use with different sized boxes.

At its lower end the bar (A), is connected with a lever or treadle (B), through the means of a second arm ($A^1$), the point of connection being at or toward the end of the arm, as at ($A^6$). The bar (A), which from its function may be called a ram, is restrained in its movements by a clevis guard, which is secured to the upper part of the frame and embraces the ram, preventing it from movement sidewise and limiting its movement toward the rear.

A spring ($A^4$) is connected with the frame at its upper end and with the ram at its lower end, and should be of strength to raise the ram except when it is positively pressed down by the application of some power thereto. A stop anchor ($A^3$), is pivoted to the treadle and engaging the arm ($A^1$) close to the ram, limits the upward movement of the same.

A treadle (B), is pivoted to the rear of the frame immediately below member ($A^1$), extends forward and projects at the front of the frame so that it may be readily engaged by the foot of the packer. A spring, ($A^5$), connected with this treadle serves to raise it whereby the ram is reclined and also to operate a device for holding the treadle down.

Any suitable means for holding the treadle down may be used. I have shown special means for doing this which I prefer to use. As shown in Figs. 1 and 2, it is a device which holds the treadle by a frictional and clutch grip thereon, while as shown in Figs. 5 and 6, ratchet teeth are provided for engagement with the treadle, and a switch bar whereby the said treadle is detached from said ratchet teeth, the construction otherwise being substantially the same.

A bar (D), extends vertically along one side of the treadle, and is connected to the frame so as to be fixed. To this is pivoted the lock-releasing angle shaped lever ($D^1$), and also a short angle shaped link ($D^2$), on to which is pivoted on the other side of the treadle, a cleat or bar ($D^3$), so as to extend parallel with the bar (D), thereby forming a parallel opening wherein treadle B can move up or down.

The main treadle (B), lies between the bars (D), and ($D^3$). The spring ($A^5$), at its upper end is secured to and suspended by a balance or equalizing lever ($D^4$) which at its other end is connected by a wire (G), to the releasing lever ($D^1$), the connections being such as to tend to lift the releasing lever ($D^1$), thereby causing the bar ($D^3$), to be raised and swung toward the bar (D), thereby clamping the main treadle (B), between them and holding it against upward motion. The lifting tendency of the treadle (B), acting frictionally against the rod ($D^3$), tends to move it upward, or in the direction which causes it to grip the treadle (B) more tightly. The balance or equalizing lever ($D^4$), is suspended to the frame by a suspender ($D^5$) extending across the same, and is provided with a plurality of holes so that the pull of the spring ($A^5$), upon the releasing lever ($D^1$), may be varied, thereby controlling the strength of the grip.

The device shown in Figs. 5 and 6 is the same as that above described, except that friction between the parts is not relied upon to hold the treadle down. The bar (D), is here shown as provided with ratchet teeth which are engaged by the sharp edges of the treadle. I have shown this bar (D), as having these teeth upon each side and end, thereby multiplying the number of teeth and making it possible to reverse the bar and thereby secure a new set of teeth, should one set become worn and not hold well.

The top of the frame may be provided with trays or boxes at the spaces outside of the box-ends for the holding of nails or tools used in securing the box covers. Figs. 1, 3 and 5, show a box in place, while the others do not.

By the use of this device the cover may be securely and quickly pressed down upon the fruit and held while being nailed by only one man. The security by which this may be done and its quickness make the work much less expensive.

The operation of the device is as follows:—In the normal position of the parts when not in use, the ram (A), is raised and tilted back, occupying the position shown in Fig. 4. As the ram (A), is reclined by means of spring ($A^5$) and the press clamp is moved to the rear it comes in contact with trip rods (o, o), and is turned upward or to a vertical position, as shown in Fig. 4, being thereby gotten out of the way of the operator in taking away or putting on a box of fruit. For this purpose the clamp is mounted to turn upon the arm ($A^2$). With the parts in this position, a box of fruit is put upon the table, the cover placed upon the fruit and the treadle (B), depressed by the foot of the operator. The first result is to swing the ram and the clamp forward. Preferably the clamp is balanced so that when unrestrained it tends to occupy the horizontal position; therefore, when it is swung out of contact with the trip rods (o, o) it swings down to a horizontal position above the box. Further depression of the treadle (B), brings the ram (A), and the clamp down upon the box cover until it contacts with the box ends, whereupon it is nailed. When this has been done the releasing lever ($D^1$), is depressed, releasing the treadle (B), and permitting the springs to throw the treadle and the ram upward and backward.

In the construction shown in Figs. 5 and 6, the lever ($D^1$), has an angular and upward extension to its pivot end and the link ($D^2$), has a similar upward extension, upon which extension is pivoted a releasing bar ($D^6$), which pushes the lever or treadle (B), out of engagement with the notches upon the bar (D).

In using my device for different sizes of boxes the arm ($A^2$), may be lowered upon the ram (A), and also the cleats (C¹), may be moved inward or outward upon the yoke (C²).

While I have stated that the arm upon the upper end of the ram may be made adjustable to accommodate boxes of different height, I prefer to leave this at the same height all the time and adjust for boxes of different height by blocking up the box supports. This may be readily done at small expense of time and material and will leave the top surface of the box, which is the working surface, at the same level, irrespective of the thickness of the box. The thickness of these boxes will vary from about three inches for certain peach and cherry boxes, to 10½″ for a standard apple box.

In using my press upon barrels the table or support will have to be lowered very much from the level shown in the drawings. Preferably this level should be at or about at the floor level so that the barrels may be readily rolled upon it. Such changes are only such as would be evident to any person, and therefore need not be illustrated specifically.

What I claim as my invention is:

1. In a fruit-package press, in combination, a vertically extending ram or reciprocating meber adapted to reciprocate vertically and to move or recline from front to rear, a press clamp hinged to the arm, carried by the ram and adapted to engage the package cover, and a treadle connected with said ram to operate it.

2. In a fruit-package press, in combination, a vertically movable ram, a revolving press clamp carried by the ram and adapted to engage the package cover, a treadle connected with the ram to swing it forward and depress it, and means which, unrestrained, will lift said ram and move it backward as shown and described.

3. In a fruit-package press, in combination, a frame having a package-centering support, a ram mounted thereon and adapted to rise and recline, or vice versa, a revolving press clamp carried by said ram and adapted to engage the package cover, a spring normally holding the ram raised, and a treadle connected with the ram to depress it to thereby bring the clamp upon the package cover substantially as shown and described.

4. In a fruit-package press, in combination, a vertically extending ram, a press clamp carried by the ram to engage the package cover, a spring support for the lower end of said ram; guard stirrups embracing the ram to hold it against lateral displacement and to permit front and rear movement thereof; a treadle, an arm carried by the lower end of the ram and operating connections between the treadle and the end of said arm.

5. In a fruit-package press, in combination, a frame having a package centering support, a vertically extending ram at the rear of the frame, a press clamp carried by the upper end of said ram and adapted to engage the package cover; guard stirrups embracing said ram and permitting a rocking movement of the ram from front to rear; a supporting spring connected with the lower end of the ram and normally holding the press clamp above the package; an arm extending forwardly from the lower end of the ram, a treadle connected with the forward end of said arm, and a stop limiting the upward movement of the ram.

6. In a fruit-package press, in combination. a pressing member, a treadle for operating the same, a catch bar for holding the treadle when depressed, a spring-pressed member acting upon the treadle to hold it in engagement, and a releasing member to disengage it from its catch.

7. In a fruit-package press, in combination, a pressing member, a treadle for operating the same, a catch-bar for holding the treadle when depressed, holding and releasing bars pivoted by links and parallel with the said catch member, the treadle lying between the catch and holding bars, a spring acting upon said holding bar to swing it upon its links toward the catch bar, and a releasing treadle connected with said holding and releasing bars, whereby the main treadle may be released.

8. In a fruit-package press, in combination, a pressing member, a treadle connected with said pressing member to operate it, a catch bar lying alongside the treadle and having ratchet teeth upon both ends and a plurality of sides, whereby it may be turned and reversed when the teeth become worn, a guard holding the treadle in engagement with the teeth of said catch bar and a detaching member releasing the treadle with the teeth of said catch bar.

9. In a fruit-package press, in combination, a pressing member, a treadle connected with and operating said pressing member, a catch-bar lying alongside and adapted to be engaged and disengaged by said treadle, and a guard mechanism for said treadle and catch comprising a guard bar upon the opposite side of the treadle, parallel with the catch-bar and pivoted thereto by links at its ends, a detaching member to disengage the treadle from its catch, an equalizing lever, a spring connecting one end of said equalizing lever with the treadle, and a rod connecting the other end of the equalizing lever with the guard bar to swing it toward the catch bar.

10. In a fruit-package press, in combination, a package supporting frame, a ram adapted to be reciprocated vertically and moved from front to rear, means for so moving the ram, a press clamp carried by the upper end of the ram and mounted to turn upon a horizontal pivot, and a trip device engaging said clamp to turn it upward when the ram is moved toward the rear.

11. In a fruit-package press, in combination, a ram adapted to be reciprocated vertically and swung from front to rear, and an arm extending forwardly from the upper end of the ram, over the fruit package, a press clamp pivotally carried from said arm and adapted to engage the package cover, means for reciprocating said ram and for swinging it from front to rear, and trip rods adapted to engage and turn the press clamp upward as it is moved toward the rear.

JOHN O. NASLIN.

In presence of—
JOHN E. PORTER,
H. E. HARDESTY.